United States Patent
Schaefer et al.

(10) Patent No.: US 12,405,856 B2
(45) Date of Patent: Sep. 2, 2025

(54) MEMORY DIE FAULT DETECTION USING A CALIBRATION PIN

(71) Applicant: Micron Technology, Inc., Boise, ID (US)

(72) Inventors: Scott E. Schaefer, Boise, ID (US); Paul A. Laberge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 20 days.

(21) Appl. No.: 18/584,385

(22) Filed: Feb. 22, 2024

(65) Prior Publication Data
US 2024/0303157 A1    Sep. 12, 2024

Related U.S. Application Data

(60) Provisional application No. 63/489,591, filed on Mar. 10, 2023.

(51) Int. Cl.
*G06F 11/10* (2006.01)
*G06F 11/07* (2006.01)

(52) U.S. Cl.
CPC ...... *G06F 11/1068* (2013.01); *G06F 11/0787* (2013.01); *G06F 11/079* (2013.01)

(58) Field of Classification Search
None
See application file for complete search history.

(56) References Cited

U.S. PATENT DOCUMENTS

| | | | | |
|---|---|---|---|---|
| 7,332,904 B1* | 2/2008 | Menkus | ............ | H03K 19/0005 |
| | | | | 257/48 |
| 2007/0007992 A1* | 1/2007 | Bains | ................... | G11C 29/028 |
| | | | | 326/30 |
| 2014/0325135 A1* | 10/2014 | Anderson | .......... | H03K 19/0005 |
| | | | | 711/105 |
| 2016/0182044 A1* | 6/2016 | Addepalli | .............. | G11C 16/06 |
| | | | | 326/30 |
| 2018/0158495 A1* | 6/2018 | Jeon | ...................... | G11C 29/028 |
| 2024/0086347 A1* | 3/2024 | Mahmoodi | ......... | G06F 13/1694 |

OTHER PUBLICATIONS

H. Lee et al., "Design of non-contact 2Gb/s I/O test methods for high bandwidth memory (HBM)," 2016 IEEE Asian Solid-State Circuits Conference (A-SSCC), Toyama, Japan, 2016, pp. 169-172, (Year: 2016).*

* cited by examiner

*Primary Examiner* — Daniel F. McMahon
(74) *Attorney, Agent, or Firm* — Holland & Hart LLP

(57) ABSTRACT

Methods, systems, and devices for memory die fault detection using a calibration pin are described. A memory device may perform a calibration procedure on a first resistor of each of a set of memory dies of a memory module using a pin coupled with the memory module. The memory device may couple the pin to a second resistor of a memory die of the set of memory dies based on the memory die identifying a fault condition for the memory die executing one or more of multiple commands from the host device. The memory device may receive, from the host device, a command to read a register of one or more memory dies of the set of memory dies and may output, to the host device, an indication of the memory die that identified the fault condition based on coupling the pin to the second resistor.

20 Claims, 9 Drawing Sheets

MEMORY DIE FAULT DETECTION USING A CALIBRATION PIN

CROSS REFERENCE

The present Application for Patent claims priority to and the benefit of U.S. Provisional Application No. 63/489,591 by Schaefer et al., entitled "MEMORY DIE FAULT DETECTION USING A CALIBRATION PIN," filed Mar. 10, 2023, assigned to the assignee hereof, and which is expressly incorporated by reference in its entirety herein.

TECHNICAL FIELD

The following relates to one or more systems for memory, including memory die fault detection using a calibration pin.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not- or (NOR) and not- and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

In some non-volatile memory devices (e.g., a dynamic random access memory (DRAM) device), a circuit fault may occur during operation of the non-volatile memory device without detection (e.g., due to the non-volatile memory device failing to indicate the fault to a host device communicating with the non-volatile memory device). Such a scenario may occur if the memory device lacks circuit pins that enable fault detection and/or indication thereof. In examples in which multiple non-volatile memory dies are on a memory module, a separate pin for each of the non-volatile memory dies dedicated to indicating fault conditions may indicate a fault. However, having a separate pin for each of the non-volatile memory dies may result in less availability on the memory module for other pins and/or an increased size of the memory module to account for the increased quantity of pins. Other mechanisms for fault detection may be constrained to offline fault detection.

The present disclosure describes mechanisms that may enable a reduced pin count as compared to having a dedicated pin for each non-volatile memory die and/or may not be constrained to offline fault detection. For instance, a calibration pin (e.g., an output impedance calibration pin such as a ZQ pin) in a non-volatile memory device may be configured to support optional operation for circuit fault detection. For instance, when a circuit fault is detected, the memory device may couple an internal voltage (e.g., via a circuit path such as a resistor) to the ZQ pin, which may correspond to a certain voltage value (e.g., may have a certain voltage). The ZQ pin may be coupled with a host device. Accordingly, the certain voltage value on the ZQ pin may provide an indication to the host device. The host device, after receiving the indication, may query one or more memory dies on the memory module to receive information associated with the fault. In some examples, multiple memory dies of the memory module may have ZQ pins connected to one pin coupled with the host device. Additionally or alternatively, a ZQ pin may be coupled with multiple memory dies (e.g., each memory die) of the memory module.

Features of the disclosure are initially described in the context of systems and dies as described with reference to FIGS. 1 and 2. Features of the disclosure are described in the context of a fault detection scheme and fault indication schemes as described with reference to FIGS. 3 through 5. These and other features of the disclosure are further illustrated by and described with reference to an apparatus diagram and flowcharts that relate to memory die fault detection using a calibration pin as described with reference to FIGS. 6 through 9.

Figure 1:
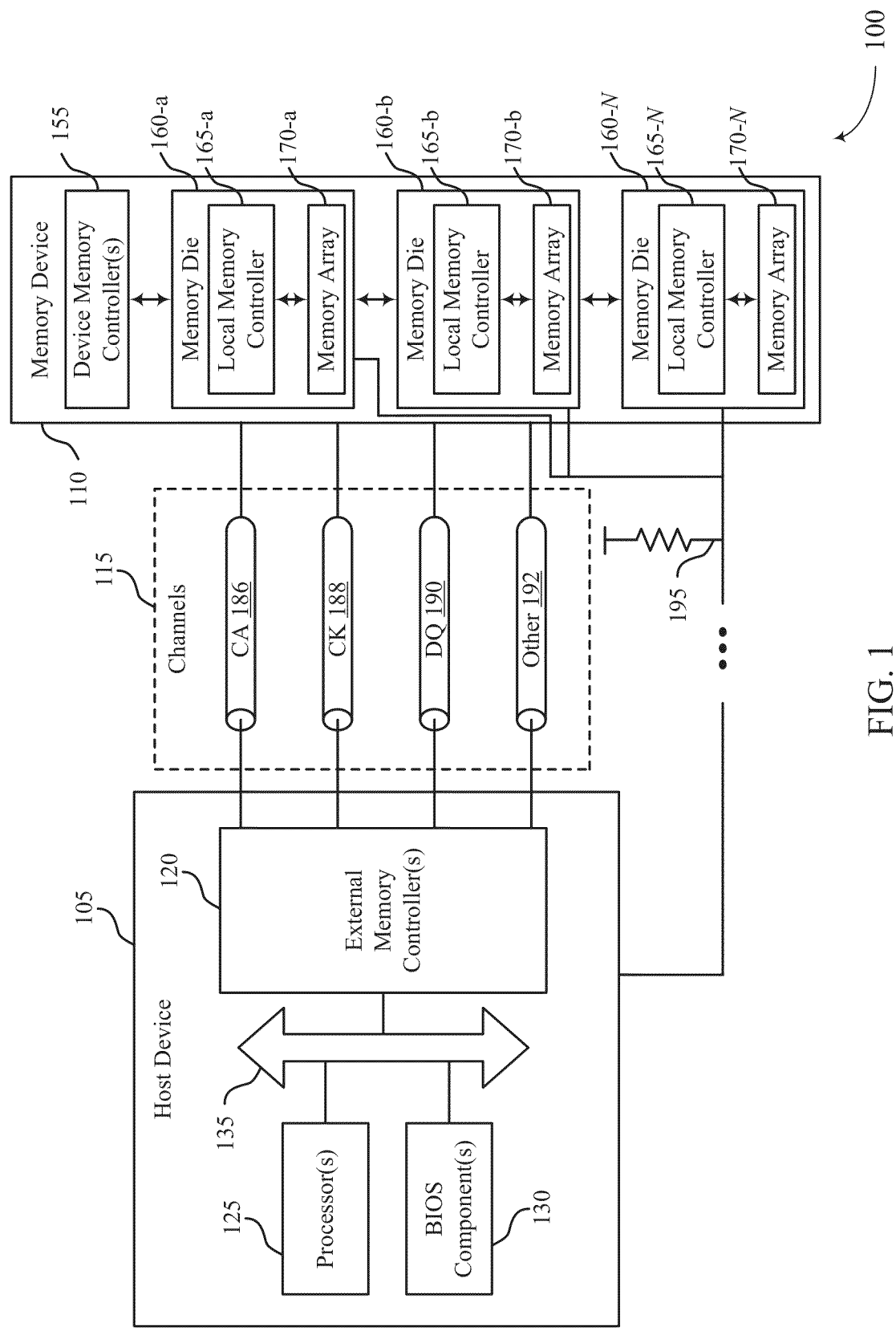
FIG. 1 illustrates an example of a system that supports memory die fault detection using a calibration pin in accordance with examples as disclosed herein.

FIG. 1 illustrates an example of a system 100 that supports memory die fault detection using a calibration pin in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of one or more external memory controllers 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands The host device 105 may include one or more of an external memory controller 120, one or more processors 125, one or more basic input/output system (BIOS) component(s) 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

In some examples, the system 100 or the host device 105 may include various peripheral components. The peripheral components may be any input device or output device, or an interface for such devices, that may be integrated into or with the system 100 or the host device 105. Examples may include one or more of: a disk controller, a sound controller, a graphics controller, an Ethernet controller, a modem, a universal serial bus (USB) controller, a serial or parallel port, or a peripheral card slot such as peripheral component interconnect (PCI) or specialized graphics ports. The peripheral component(s) may be other components understood by a person having ordinary skill in the art as a peripheral.

In some examples, the system 100 or the host device 105 may include an I/O controller. An I/O controller may manage data communication between the processor 125 and the peripheral component(s) (e.g., input devices, output devices). The I/O controller may manage peripherals that are not integrated into or with the system 100 or the host device 105. In some examples, the I/O controller may represent a physical connection (e.g., one or more ports) with external peripheral components.

In some examples, the system 100 or the host device 105 may include an input component, an output component, or both. An input component may represent a device or signal external to the system 100 that provides information (e.g., signals, data) to the system 100 or its components. In some examples, an input component may include an interface (e.g., a user interface or an interface between other devices). In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include one or more device memory controllers 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include one or more local memory controllers 165 (e.g., local memory controller 165-a, local memory controller 165-b, local memory controller 165-N) and one or more memory arrays 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

A memory die 160 may be an example of a two-dimensional (2D) array of memory cells or may be an example of a three-dimensional (3D) array of memory cells. In some examples, a 2D memory die 160 may include a single memory array 170. In some examples, a 3D memory die 160 may include two or more memory arrays 170, which may be stacked on top of one another or positioned next to one another (e.g., relative to a substrate). In some examples, memory arrays 170 in a 3D memory die 160 may be referred to as or otherwise include different sets (e.g., decks, levels, layers, dies). A 3D memory die 160 may include any quantity of stacked memory arrays 170 (e.g., two high, three high, four high, five high, six high, seven high, eight high). In some 3D memory dies 160, different decks may share a common access line such that some decks may share one or more of a word line, a digit line, or a plate line.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, clock signal channels 188 may be operable to communicate one or more clock signals between the host device 105 and the memory device 110. Clock signals may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. A symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. A symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some non-volatile memory devices 110 (e.g., a dynamic random access memory (DRAM) device), a circuit fault may occur during operation of the non-volatile memory device 110 without detection (e.g., due to the non-volatile memory device 110 failing to indicate the fault to a host device communicating with the non-volatile memory device 110). Such a scenario may occur if the memory device 110 lacks circuit pins that enable fault detection and/or indication thereof. In examples in which the memory device 110 includes a memory module and multiple non-volatile memory dies are on the memory module (e.g., memory dies 160-*a*, 160-*b*, and 160-*c*), a separate pin for each of the non-volatile memory dies dedicated to indicating fault conditions may indicate a fault. However, having a separate pin for each of the non-volatile memory dies may result in less availability on the memory module for other pins and/or an increased size of the memory module to account for the increased quantity of pins. Other mechanisms for fault detection may be constrained to offline fault detection.

The present disclosure describes mechanisms that may enable a reduced pin count as compared to having a dedicated pin for each non-volatile memory die and/or may not be constrained to offline fault detection. For instance, a ZQ pin 195 in a non-volatile memory device 105 may be configured to support optional operation for circuit fault detection. For instance, when a circuit fault is detected, the ZQ pin 195 may correspond to a certain value (e.g., may have a certain voltage). The ZQ pin 195 may be coupled with a host device 105. Accordingly, the ZQ pin 195 corresponding to the certain value may provide an indication to the host device 105. The host device 105, after receiving the indication, may query one or more memory dies on the memory module to receive information associated with the fault. In some examples, multiple memory dies of the memory module may have ZQ pins 195 connected to one pin coupled with the host device 105. Additionally or alternatively, a ZQ pin 195 may be coupled with multiple memory dies (e.g., each memory die) of the memory module (e.g., memory dies 160-*a*, 160-*b*, and 160-*c*).

Figure 2:
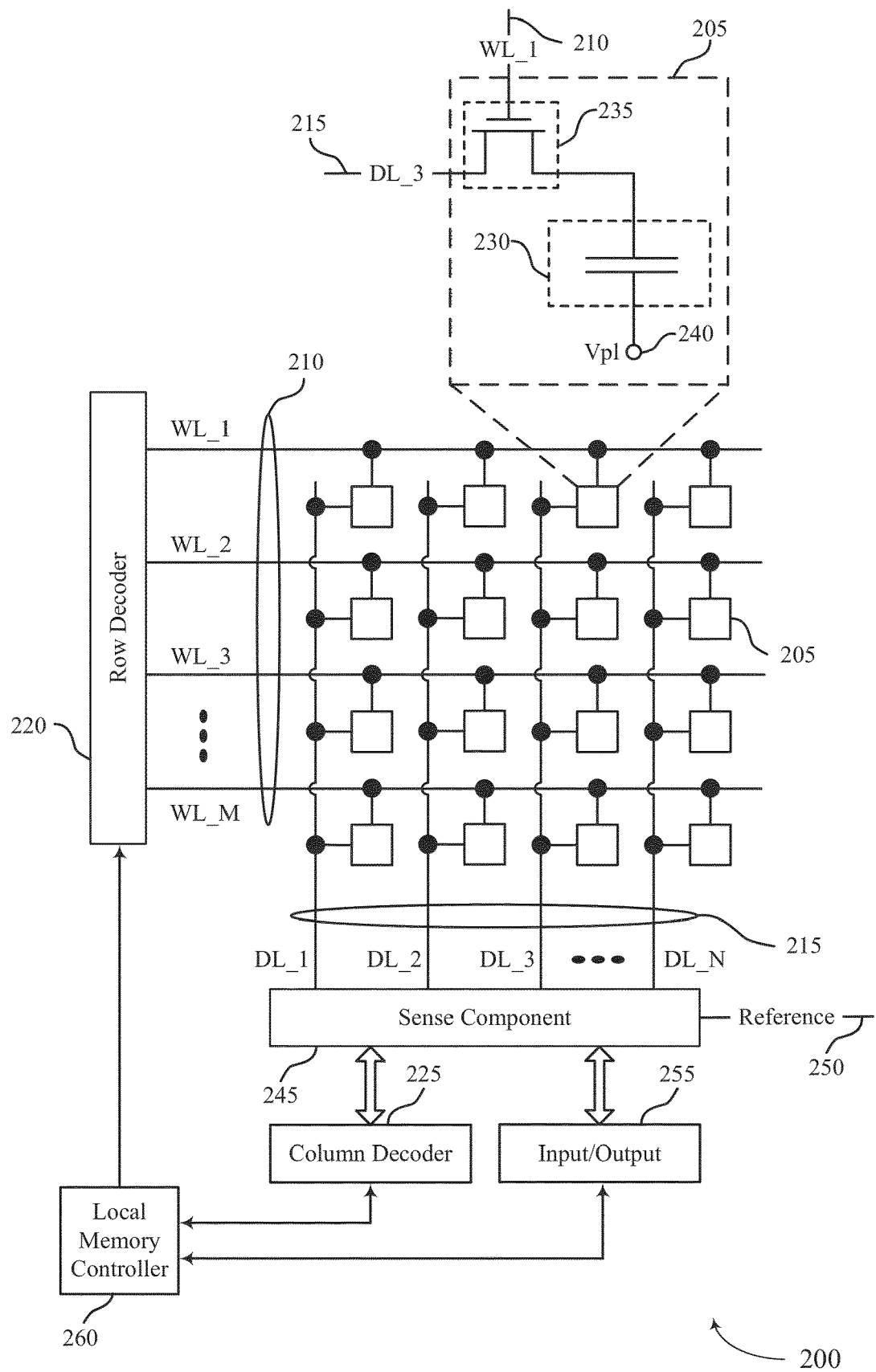
FIG. 2 illustrates an example of a memory die that supports memory die fault detection using a calibration pin in accordance with examples as disclosed herein.

FIG. 2 illustrates an example of a memory die 200 that supports memory die fault detection using a calibration pin in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

A word line 210 may be a conductive line in electronic communication with a memory cell 205 that is used to perform access operations on the memory cell 205. In some architectures, the word line 210 may be coupled with a gate of a switching component 235 of a memory cell 205 and may be operable to control the switching component 235 of the memory cell. In some architectures, the word line 210 may be coupled with a node of the capacitor of the memory cell 205 and the memory cell 205 may not include a switching component.

A digit line 215 may be a conductive line that couples the memory cell 205 with a sense component 245. In some architectures, the memory cell 205 may be selectively coupled with the digit line 215 during portions of an access operation. For example, the word line 210 and the switching component 235 of the memory cell 205 may be operable to couple or isolate the capacitor 230 of the memory cell 205 and the digit line 215. In some architectures, the memory cell 205 may be coupled with the digit line 215.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired state (e.g., logic state, charge state). The local memory controller 260 may identify a target memory cell 205 on which to perform the write operation. The local memory controller 260 may identify a target word line 210 and a target digit line 215 coupled with the target memory cell 205 (e.g., an address of the target memory cell 205). The local memory controller 260 may activate the target word line 210 and the target digit line 215 (e.g., applying a voltage to the word line 210 or digit line 215) to access the target memory cell 205. The local memory controller 260 may apply a signal (e.g., a write pulse, a write voltage) to the digit line 215 during the write operation to store a specific state (e.g., charge) in the capacitor 230 of the memory cell 205. The signal used as part of the write operation may include one or more voltage levels over a duration.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

In some examples, a first resistor of memory die 200 may be coupled with a ZQ pin (e.g., a ZQ pin as described with reference to FIG. 1). If memory die 200 detects a fault, memory die 200 may isolate the first resistor from the ZQ pin and may couple a second resistor (e.g., a lower impedance resistor) with the ZQ pin. Coupling the second resistor with the ZQ pin may adjust a voltage or current on the ZQ pin, which may provide an indication to a host device coupled with the ZQ pin. After receiving the indication, the host device may query the memory die 200 or may query a master memory die of a memory module including memory die 200 (e.g., in examples in which memory die 200 is not the master memory die). The memory die 200 or the master memory die may output an indication of the memory die 200 that coupled the second resistor with the ZQ pin.

Figure 3:
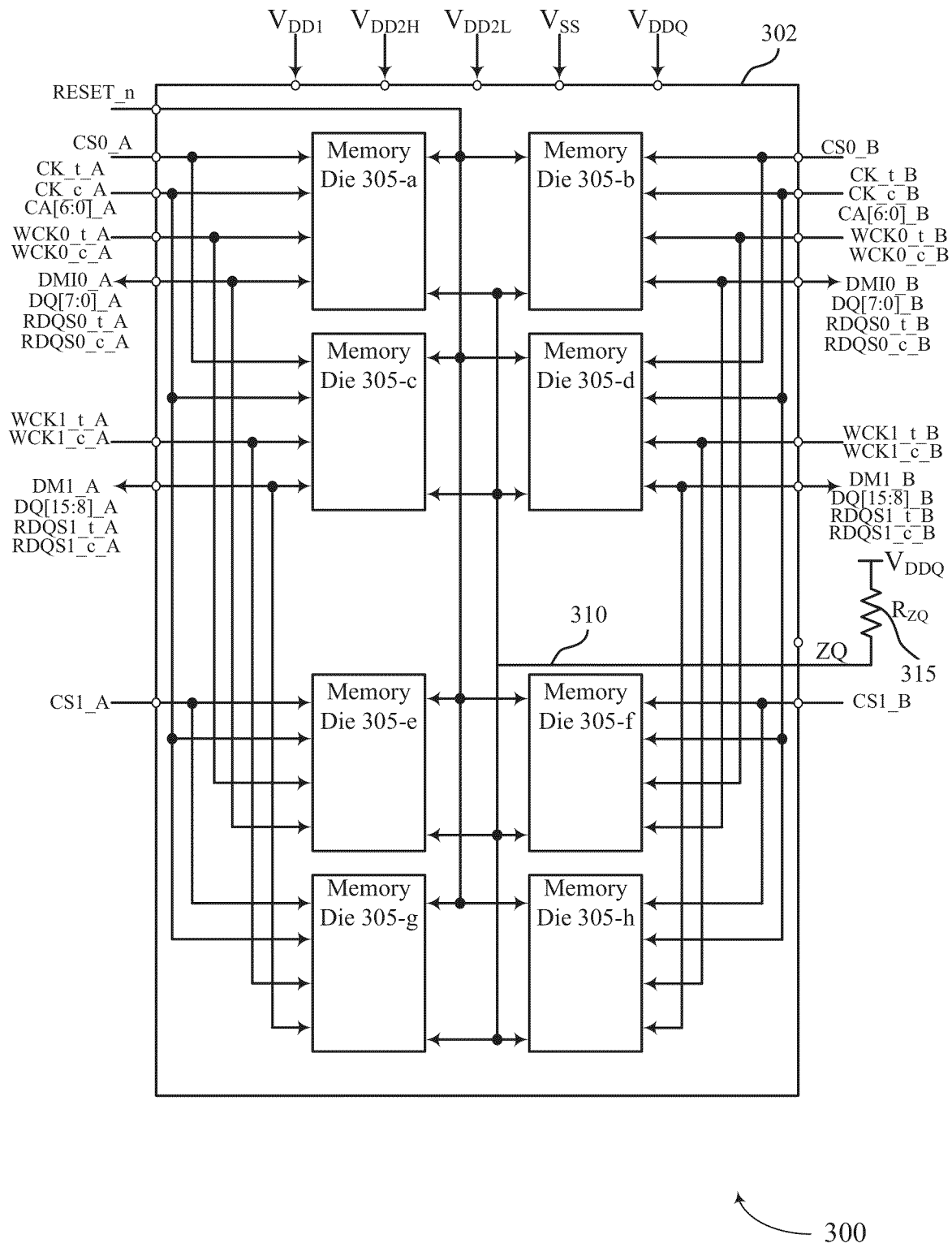
FIG. 3 illustrates an example of a fault detection scheme that supports memory die fault detection using a calibration pin in accordance with examples as disclosed herein.

FIG. 3 illustrates an example of a fault detection scheme 300 that supports memory die fault detection using a calibration pin in accordance with examples as disclosed herein. In some examples, fault detection scheme 300 may implement one or more aspects of system 100 and/or memory die 200. For instance, memory module 302 may be an example of a memory device 110 as described with reference to FIG. 1. Additionally or alternatively, memory dies 305-a, 305-b, 305-c, 305-d, 305-e, 305-f, 305-g, and 305-h may each be an example of a memory die as described with reference to FIG. 1 (e.g., memory dies 160-a, 160-b, and 160-c) and/or memory die 200 as described with reference to FIG. 2. Additionally or alternatively, ZQ pin 310 may be an example of ZQ pin 195 as described with reference to FIG. 1.

In some non-volatile memory devices (e.g., a dynamic random access memory (DRAM) device), a circuit fault may occur during operation of the non-volatile memory device without detection (e.g., due to the non-volatile memory device failing to indicate the fault to a host device communicating with the non-volatile memory device). Such a scenario may occur if the memory device lacks circuit pins that enable fault detection and/or indication thereof. In examples in which multiple non-volatile memory dies are on a memory module, a separate pin for each of the non-volatile memory dies dedicated to indicating fault conditions may indicate a fault. However, having a separate pin for each of the non-volatile memory dies may result in less availability on the memory module for other pins and/or an increased size of the memory module to account for the increased quantity of pins (e.g., a memory interface including the pins may have an increasing quantity of inputs and/or outputs). Other mechanisms for fault detection may be constrained to offline fault detection.

The present disclosure describes mechanisms that may enable a reduced pin count as compared to having a dedicated pin for each non-volatile memory die and/or may not be constrained to offline fault detection. For instance, memory module 302 may include memory dies 305-a through 305-h, each coupled with ZQ pin 310. In some examples, ZQ pin 310 may include a resistor 315 (e.g., $R_{ZQ}$) which may be coupled to a voltage source used for the output pins (e.g., $V_{DDQ}$) and may be used for a calibration procedure, such as ZQ calibration. For instance, each of memory dies 305-a through 305-h may include a first resistor (e.g., an output drive resistor). The ZQ calibration routine may be used to match the first resistors of memory dies 305-a through 305-h with resistor 315. When ZQ calibration is in progress, the voltage at ZQ pin 310 may be approximately $V_{DDQ}/2$ (e.g., the calibration procedure may trim the first resistors such that the voltage is $V_{DDQ}/2$). Additionally, when ZQ calibration is not in progress, the voltage at ZQ pin 310 may be approximately $V_{DDQ}$. In some examples, ZQ calibration may be performed at memory dies 305-a through 305-h one at a time (e.g., the calibration may be performed sequentially). For example, the memory dies 305-a through 305-h may couple, sequentially, their first resistors (e.g., calibrating their first resistors) to the ZQ pin 310 (e.g., to a ZQ pin on the memory die coupled to the ZQ pin 310 on the memory module 302). In some examples, memory die 305-a may be the master memory die.

After the calibration procedure is performed, one or more of memory dies 305-a through 305-h may receive commands from a host device (e.g., a host device 105 as described with reference to FIG. 1). In some examples a memory die of memory dies 305-a through 305-h executing one or more of the commands received from the host device may experience a fault condition. In such examples, the memory die may couple a second resistor of the memory die with ZQ pin 310 (e.g., each of memory dies 305-a through 305-h may have a respective first resistor and a respective second resistor couplable with ZQ pin 310). The second resistor may have a lower resistance than the first resistor of the memory die. Accordingly, a voltage on at ZQ pin 310 may be reduced to be below $V_{DDQ}/2$ (e.g., below a third of $V_{DDQ}/2$). Reducing the voltage in this manner may indicate to the host device, which may be coupled with ZQ pin 310, that a fault condition has occurred at memory module 302. In some examples, after coupling the second resistor with ZQ pin 310 for a predetermined duration (e.g., a duration unique to the memory die relative to the other memory dies of memory module 302), the second resistor may be isolated from ZQ pin 310.

In some examples, the host device may transmit to one or more of memory dies 305-a through 305-h an indication to read a register of one or more memory dies of memory dies 305-a through 305-h after receiving the indication from ZQ pin 310. A master memory die (e.g., memory die 305-a) or whichever memory die coupled the second resistor with ZQ pin 310 may output, to the host device, an indication of the memory die that identified the fault condition (that coupled the second resistor with ZQ pin 310). In examples in which the master memory die outputs the indication, the master memory die (e.g., memory die 305-a) may detect the memory die with the fault condition based on a length of a pulse on the ZQ pin 310 when the memory die couples the second resistor with ZQ pin 310. For instance, each memory die of memory dies 310-a through 310-h may have a different length for which ZQ pin 310 is pulled down to indicate a fault. After detecting which memory die coupled its second resistor with ZQ pin 310, the master memory die may store at the register, an indication of the memory die that triggered the fault condition and may read the register when the master memory die receives the query (e.g., the command to read the register) from the host device. In some examples, the fault condition may include an error correcting code (ECC) engine check fault, a special function fault (e.g., a secondary function fault), a valid read operation flag fault, an ECC syndrome check fault, a master error log fault, a command/address write parity mode fault, a reset confirmation indicator fault, an unintended test mode entry flag fault, a fuse load check flag fault, or any combination thereof.

Memory module 302 including the ZQ pin 310 may enable a host device to detect a fault at a memory die of memory module 302 while using a single pin for conveying the fault indication, which may allow for more efficient use of space as compared to having a dedicated pin for each of memory dies 305-a through 305-h. Additionally, ZQ pin 310 may also be used for a calibration procedure, thus resulting in the pin being usable for multiple operations (e.g., as compared to one pin for fault detection and one pin for the calibration procedure).

Figure 4A:
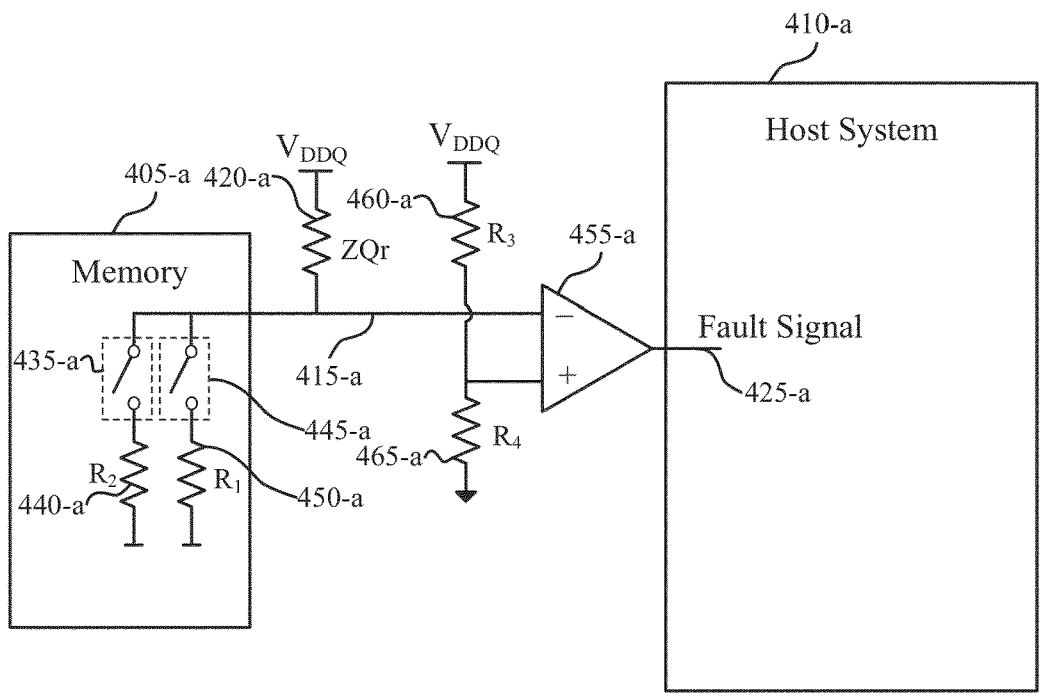
FIGS. 4A and 4B illustrate examples of fault indication schemes that supports memory die fault detection using a calibration pin in accordance with examples as disclosed herein.

FIG. 4A illustrates an example of a fault indication scheme 400-a that supports memory die fault detection using a calibration pin in accordance with examples as disclosed herein. In some examples, fault indication scheme 400-a may be implemented by one or more aspects of system 100, memory die 200, and/or fault detection scheme 300. For instance, host system 410-a may be an example of a host device 105 as described with reference to FIG. 1. Additionally or alternatively, memory 405-a may be an example of a memory device 110, one of memory dies 160-a through 160-c, a memory die 200, memory module 302, or one of memory dies 305-a through 305-h, each as described in one or more of FIGS. 1 through 3. In some examples, ZQ pin 415-a may be an example of a ZQ pin 195 as described with reference to FIG. 1 and/or a ZQ pin 310 as described with reference to FIG. 3. In some examples, ZQ resistor 420-a may be an example of resistor 315 as described with reference to FIG. 3.

Memory 405-a may include first resistor 450-a (e.g., $R_1$) and second resistor 440-a (e.g., $R_2$). In some examples, first resistor 450-a may be selectively couplable with ZQ pin 415-a via switch 445-a and second resistor 440-a may be selectively couplable with ZQ pin 415-a via switch 435-a. In other examples, switch 445-a may not be present and resistor 450-a may be directly coupled with ZQ pin 415-a. In some examples, one or each of switches 435-a and 445-a may be a transistor (e.g., the terminals at ZQ pin 415-a and one or each of resistors 450-a or 440-a may be a source and drain of the respective transistors). In some examples, ZQ pin 415-a may be coupled with ZQ resistor 420-a (e.g., ZQr) and operational amplifier (OP AMP) 455-a (e.g., a negative terminal of OP AMP 455-a). In some examples, OP AMP 455-a (e.g., a positive terminal of OP AMP 455-a) may be coupled with a third resistor 460-a (e.g., $R_3$) and a fourth resistor 465-a (e.g., $R_4$). In some examples, ZQ resistor 420-a and fourth resistor 465-a may each be coupled with a voltage source (e.g., $V_{DDQ}$, a 600 millivolt source). In some examples, third resistor 460-a may have a value twice that of fourth resistor 465-a (e.g., $R_4$ may equal ⅓R and $R_3$ may equal ⅔R). In some examples, OP AMP 455-a may have an output line 425-a coupled with host system 410-a. In the present example, OP AMP 455-a may be located external to host system 410-a.

Initially, first resistor 450-a may be coupled with ZQ pin 415-a for a calibration procedure using ZQ resistor 420-a (e.g., a procedure that configures first resistor 450-a to have a resistance that matches ZQ resistor 420-a). After the calibration procedure, first resistor 450-a may be isolated from ZQ pin 415-a (e.g., via switch 445-a isolating ZQ pin 415-a and first resistor 450-a) or may remain coupled with ZQ pin 415-a (e.g., via switch 445-a continuing to couple ZQ pin 415-a and first resistor 450-a remaining coupled with ZQ pin 415-a due to switch 445-a not being present). During the calibration procedure, a voltage of ZQ pin 415-a may be approximately equal to $V_{DDQ}/2$. After the calibration procedure is complete, the voltage on ZQ pin 415-a may be approximately equal to $V_{DDQ}$. Additionally, after the calibration procedure is complete, host system 410-a may begin transmitting one or more commands to memory 405-a. In some examples, while executing the one or more commands, memory 405-a may experience a fault condition. In such examples memory 405-a may couple second resistor 440-a to ZQ pin 415-a via switch 435-a. As second resistor 440-a may have a lower resistance than first resistor 450-a, a voltage at ZQ pin 415-a may be reduced to be below $V_{DDQ}/2$ (e.g., below a third of $V_{DDQ}/2$, below 100 millivolts). When this voltage is produced at ZQ pin 415-a, OP AMP 455-a may generate a fault signal at output line 425-a that host system 410-a may detect to determine that a fault condition has occurred at memory 405-a. In some examples, after coupling the second resistor 440-a with ZQ pin 415-a for a predetermined duration, the second resistor 440-a may be isolated from ZQ pin 415-a.

Figure 4B:
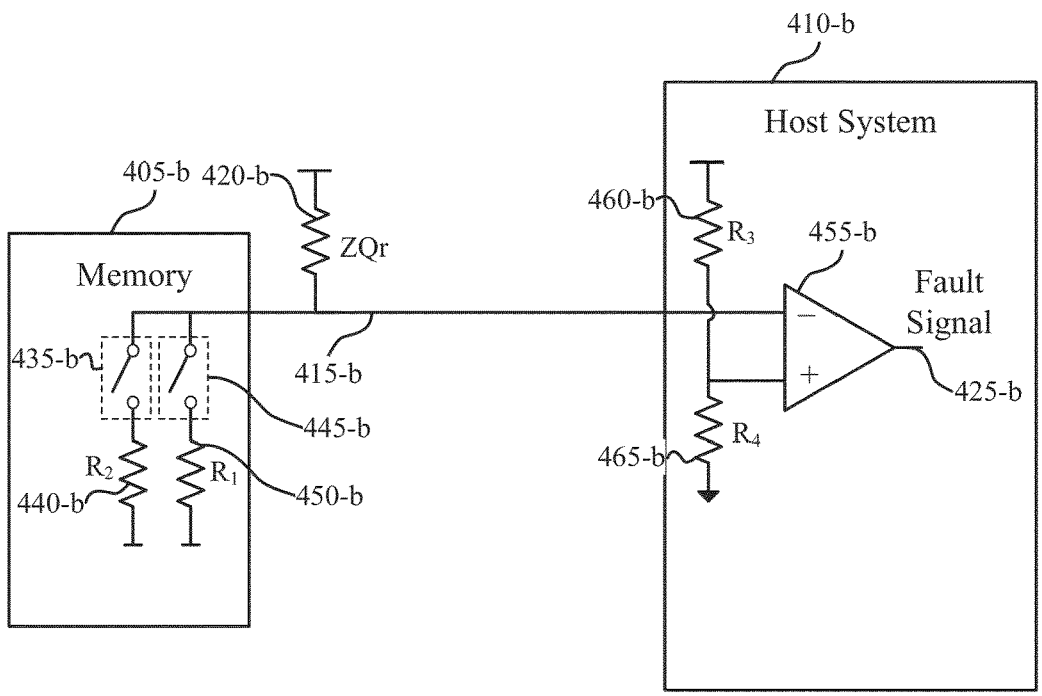

FIG. 4B illustrates an example of a fault indication scheme 400-b that supports memory die fault detection using a calibration pin in accordance with examples as disclosed herein. In some examples, fault indication scheme 400-b may be implemented by one or more aspects of system 100, memory die 200, and/or fault detection scheme 300. For instance, host system 410-b may be an example of a host device 105 as described with reference to FIG. 1. Additionally or alternatively, memory 405-b may be an example of a memory device 110, one of memory dies 160-a through 160-c, a memory die 200, memory module 302, or one of memory dies 305-a through 305-h, each as described in one or more of FIGS. 1 through 3. In some examples, ZQ pin 415-b may be an example of a ZQ pin 195 as described with reference to FIG. 1 and/or a ZQ pin 310 as described with reference to FIG. 3. In some examples, ZQ resistor 420-b may be an example of resistor 315 as described with reference to FIG. 3.

Memory 405-b may include first resistor 450-b (e.g., $R_1$) and second resistor 440-b (e.g., $R_2$). In some examples, first resistor 450-b may be selectively couplable with ZQ pin 415-b via switch 445-b and second resistor 440-b may be selectively couplable with ZQ pin 415-b via switch 435-b. In other examples, switch 445-b may not be present and resistor 450-b may be directly coupled with ZQ pin 415-b. In some examples, one or each of switches 435-b and 445-b may be a transistor (e.g., the terminals at ZQ pin 415-b and one or each of resistors 450-b or 440-b may be a source and drain of the respective transistors). In some examples, ZQ pin 415-b may be coupled with ZQ resistor 420-b (e.g., ZQr)

and operational amplifier (OP AMP) 455-b (e.g., a negative terminal of OP AMP 455-b). In some examples, OP AMP 455-b (e.g., a positive terminal of OP AMP 455-b) may be coupled with a third resistor 460-b (e.g., $R_3$) and a fourth resistor 465-b (e.g., $R_4$). In some examples, ZQ resistor 420-b and fourth resistor 465-b may each be coupled with a voltage source (e.g., $V_{DDQ}$, a 600 millivolt source). In some examples, third resistor 460-b may have a value twice that of fourth resistor 465-b (e.g., $R_4$ may equal ⅓R and $R_3$ may equal ⅔R). In some examples, OP AMP 455-b may have an output line 425-b coupled with host system 410-b. In the present example, OP AMP 455-b may be located within host system 410-b. In some such examples, a voltage detector may be placed external to host system 410-b for measuring the voltage at ZQ pin 415-b closer to ZQ resistor 420-b.

Initially, first resistor 450-b may be coupled with ZQ pin 415-b for a calibration procedure using ZQ resistor 420-b (e.g., a procedure that allows first resistor 450-b to have a resistance that matches ZQ resistor 420-b). After the calibration procedure, first resistor 450-b may be isolated from ZQ pin 415-b (e.g., via switch 445-b isolating ZQ pin 415-b and first resistor 450-b) or may remain coupled with ZQ pin 415-b (e.g., via switch 445-b continuing to couple ZQ pin 415-b and first resistor 450-b or remaining coupled with ZQ pin 415-b due to switch 445-b not being present). During the calibration procedure, a voltage of ZQ pin 415-b may be approximately equal to $V_{DDQ}/2$. After the calibration procedure is complete, the voltage on ZQ pin 415-b may be approximately equal to $V_{DDQ}$. Additionally, after the calibration procedure is complete, host system 410-b may begin transmitting one or more commands to memory 405-b. In some examples, while executing the one or more commands, memory 405-b may experience a fault condition. In such examples memory 405-b may couple second resistor 440-b to ZQ pin 415-b via switch 435-b. As second resistor 440-b may have a lower resistance than first resistor 450-b, a voltage at ZQ pin 415-b may be reduced to be below $V_{DDQ}/2$ (e.g., below a third of $V_{DDQ}/2$, below 100 millivolts). When this voltage is produced at ZQ pin 415-b, OP AMP 455-b may generate a fault signal at output line 425-b that host system 410-b may detect to determine that a fault condition has occurred at memory 405-b. In some examples, after coupling the second resistor 440-b with ZQ pin 415-b for a predetermined duration, the second resistor 440-b may be isolated from ZQ pin 415-b.

Figure 5:
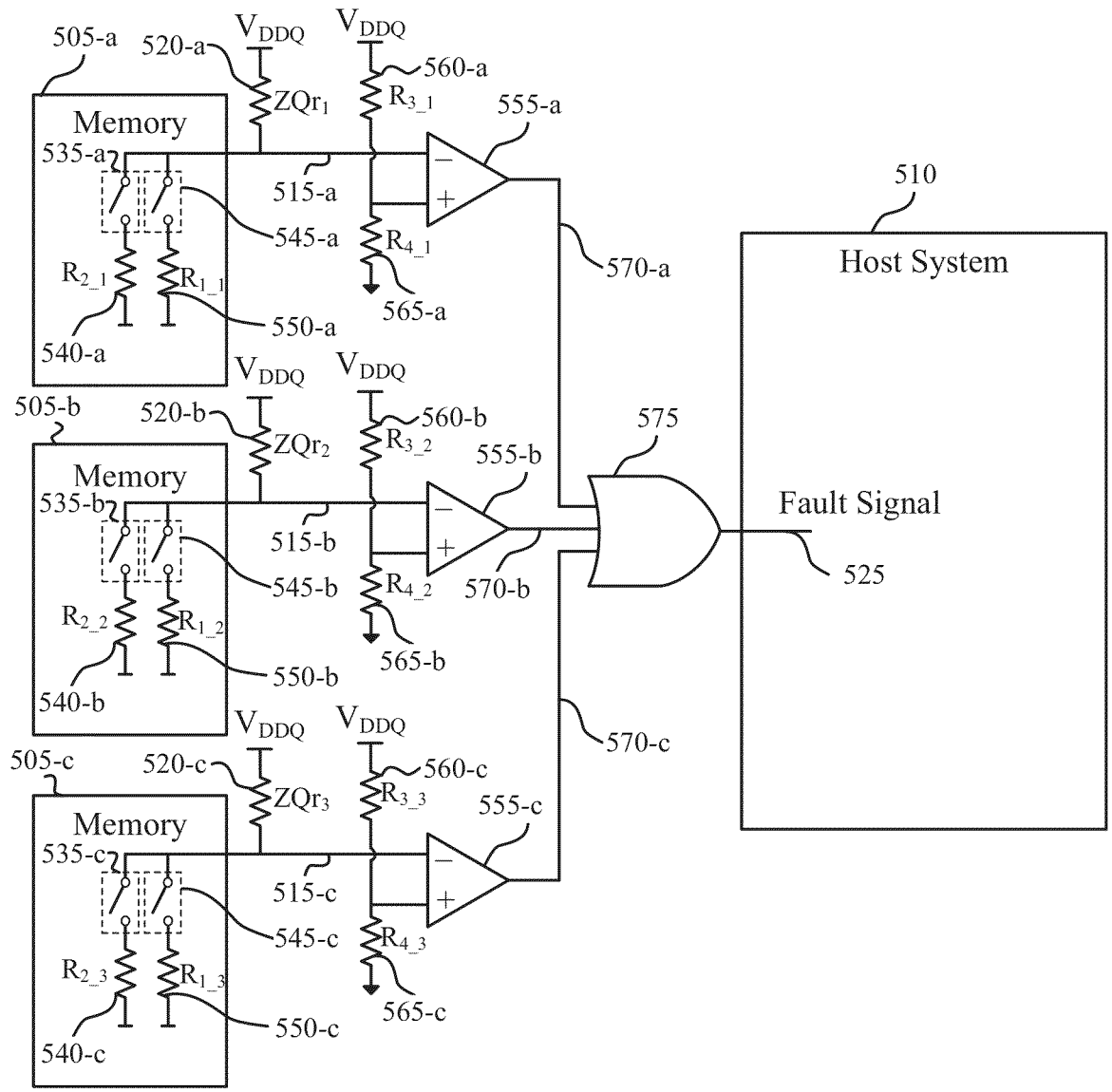
FIG. 5 illustrates an example of a fault indication scheme that supports memory die fault detection using a calibration pin in accordance with examples as disclosed herein.

FIG. 5 illustrates an example of a fault indication scheme 500 that supports memory die fault detection using a calibration pin in accordance with examples as disclosed herein. In some examples, fault indication scheme 500 may be implemented by one or more aspects of system 100, memory die 200, and/or fault detection scheme 300. For instance, host system 510 may be an example of a host device 105 as described with reference to FIG. 1. Additionally or alternatively, memory 505-a, 505-b, and/or 505-b may be an example of a memory device 110, one of memory dies 160-a through 160-c, a memory die 200, memory module 302, or one of memory dies 305-a through 305-h, each as described in one or more of FIGS. 1 through 3. In some examples, ZQ pins 515-a, 515-b, and 515-c may be an example of a ZQ pin 195 as described with reference to FIG. 1 and/or a ZQ pin 310 as described with reference to FIG. 3. In some examples, ZQ resistors 520-a, 520-b, and 520-c may be an example of resistor 315 as described with reference to FIG. 3.

Memory 505-a may include first resistor 550-a (e.g., $R_{1\_1}$) and second resistor 540-a (e.g., $R_{2\_1}$). In some examples, first resistor 550-a may be selectively couplable with ZQ pin 515-a via switch 545-a and second resistor 540-a may be selectively couplable with ZQ pin 515-a via switch 535-a. In other examples, switch 545-a may not be present and resistor 550-a may be directly coupled with ZQ pin 515-a. In some examples, one or each of switches 535-a and 545-a may be a transistor (e.g., the terminals at ZQ pin 515-a and one or each of resistors 550-a or 540-a may be a source and drain of the respective transistors). In some examples, ZQ pin 515-a may be coupled with ZQ resistor 520-a (e.g., ZQr) and operational amplifier (OP AMP) 555-a (e.g., a negative terminal of OP AMP 555-a). In some examples, OP AMP 555-a (e.g., a positive terminal of OP AMP 555-a) may be coupled with a third resistor 560-a (e.g., $R_{3\_1}$) and a fourth resistor 565-a (e.g., $R_{4\_1}$). In some examples, ZQ resistor 520-a and fourth resistor 565-a may each be coupled with a voltage source (e.g., $V_{DDQ}$, a 600 millivolt source). In some examples, third resistor 560-a may have a value twice that of fourth resistor 565-a (e.g., $R_4$ may equal ⅓R and $R_3$ may equal ⅔R). In some examples, OP AMP 555-a may have an output line 570-a coupled with OR gate 575. In the present example, OP AMP 555-a may be located external to host system 510.

Memory 505-b may include first resistor 550-b (e.g., $R_{1\_2}$) and second resistor 540-b (e.g., $R_{2\_2}$). In some examples, first resistor 550-b may be selectively couplable with ZQ pin 515-b via switch 545-b and second resistor 540-b may be selectively couplable with ZQ pin 515-b via switch 535-b. In other examples, switch 545-b may not be present and resistor 550-b may be directly coupled with ZQ pin 515-b. In some examples, one or each of switches 535-b and 545-b may be a transistor (e.g., the terminals at ZQ pin 515-b and one or each of resistors 550-b or 540-b may be a source and drain of the respective transistors). In some examples, ZQ pin 515-b may be coupled with ZQ resistor 520-b (e.g., ZQr) and operational amplifier (OP AMP) 555-b (e.g., a negative terminal of OP AMP 555-b). In some examples, OP AMP 555-b (e.g., a positive terminal of OP AMP 555-b) may be coupled with a third resistor 560-b (e.g., $R_{3\_2}$) and a fourth resistor 565-b (e.g., $R_{4\_2}$). In some examples, ZQ resistor 520-b and fourth resistor 565-b may each be coupled with a voltage source (e.g., $V_{DDQ}$, a 600 millivolt source). In some examples, third resistor 560-b may have a value twice that of fourth resistor 565-b (e.g., $R_4$ may equal ⅓R and $R_3$ may equal ⅔R). In some examples, OP AMP 555-b may have an output line 570-b coupled with OR gate 575. In the present example, OP AMP 555-b may be located external to host system 510.

Memory 505-c may include first resistor 550-c (e.g., $R_{1\_3}$) and second resistor 540-c (e.g., $R_{2\_3}$). In some examples, first resistor 550-c may be selectively couplable with ZQ pin 515-c via switch 545-c and second resistor 540-c may be selectively couplable with ZQ pin 515-c via switch 535-c. In other examples, switch 545-c may not be present and resistor 550-c may be directly coupled with ZQ pin 515-c. In some examples, one or each of switches 535-c and 545-c may be a transistor (e.g., the terminals at ZQ pin 515-c and one or each of resistors 550-c or 540-c may be a source and drain of the respective transistors). In some examples, ZQ pin 515-c may be coupled with ZQ resistor 520-c (e.g., ZQr) and operational amplifier (OP AMP) 555-c (e.g., a negative terminal of OP AMP 555-c). In some examples, OP AMP 555-c (e.g., a positive terminal of OP AMP 555-c) may be coupled with a third resistor 560-c (e.g., $R_{3\_3}$) and a fourth resistor 565-c (e.g., $R_{4\_3}$). In some examples, ZQ resistor 520-c and fourth resistor 565-c may each be coupled with a voltage source (e.g., $V_{DDQ}$, a 600 millivolt source). In some examples, third resistor 560-c may have a value twice that of fourth resistor 565-c (e.g., $R_4$ may equal ⅓R and $R_3$ may equal ⅔R). In some examples, OP AMP 555-c may have an output line 570-c coupled with OR gate 575. In the present example, OP AMP 555-c may be located external to host system 510. OR gate 575 may be external to host system 510 and may be coupled with host system 510 via output line 525.

Initially, first resistors 550-a, 550-b, and 550-c may be coupled with ZQ pins 515-a, 515-b, and 515-c, respectively for a calibration procedure using ZQ resistors 520-a, 520-b, and 520-c, respectively (e.g., a procedure that configures first resistors 550-a, 550-b, and 550-c to have a resistance that matches ZQ resistors 520-a, 520-b, and 520-c, respectively). After the calibration procedure, first resistor 550-a may be isolated from ZQ pin 515-a (e.g., via switch 545-a isolating ZQ pin 515-a and first resistor 550-a) or may remain coupled with ZQ pin 515-a (e.g., via switch 545-a continuing to couple ZQ pin 515-a and first resistor 550-a remaining coupled with ZQ pin 515-a due to switch 545-a not being present). Similarly, first resistor 550-b may be isolated from ZQ pin 515-b (e.g., via switch 545-b isolating ZQ pin 515-b and first resistor 550-b) or may remain coupled with ZQ pin 515-b (e.g., via switch 545-b continuing to couple ZQ pin 515-a and first resistor 550-b remaining coupled with ZQ pin 515-b due to switch 545-b not being present) Similarly, first resistor 550-c may be isolated from ZQ pin 515-c (e.g., via switch 545-c isolating ZQ pin 515-c and first resistor 550-c) or may remain coupled with ZQ pin 515-c (e.g., via switch 545-c continuing to couple ZQ pin 515-c and first resistor 550-c remaining coupled with ZQ pin 515-c due to switch 545-c not being present). During the calibration procedure, a voltage of ZQ pins 515-a, 515-b, and 515-c may be approximately equal to $V_{DDQ}/2$. After the calibration procedure is complete, the voltage on ZQ pins 515-a, 515-b, and 515-c may be approximately equal to $V_{DDQ}$. Additionally, after the calibration procedure is complete, host system 510 may begin transmitting one or more commands to memory 505-a, 505-b, and 505-c.

In some examples, while executing the one or more commands, one of memory 505-a, 505-b, and 505-c may experience a fault condition. For instance, in some examples, memory 505-a may experience a fault condition. In such examples memory 505-a may couple second resistor 540-a to ZQ pin 515-a via switch 535-a. As second resistor 540-a may have a lower resistance than first resistor 550-a, a voltage at ZQ pin 515-a may be reduced to be below $V_{DDQ}/2$ (e.g., below a third of $V_{DDQ}/2$, below 100 millivolts). When this voltage is produced at ZQ pin 515-a, OP AMP 555-a may generate a fault signal at output line 570-a that may be received by OR gate 575. In some examples, OR gate 575 may be configured such that OR gate 575 may output a fault signal received from any of OP AMPs 555-a, 555-b, and 555-c to host system 510. Accordingly, OR gate 575 may output the fault signal along output line 525, which host system 510 may detect to determine that a fault condition has occurred at one or more of memory 505-a, 505-b, and 505-c. In some examples, keeping OP AMPs 555-a, 555-b, and 555-c closer to memory 505-a, 505-b, and 505-c, respectively, may mitigate or prevent cross-talk during the calibration.

Figure 6:
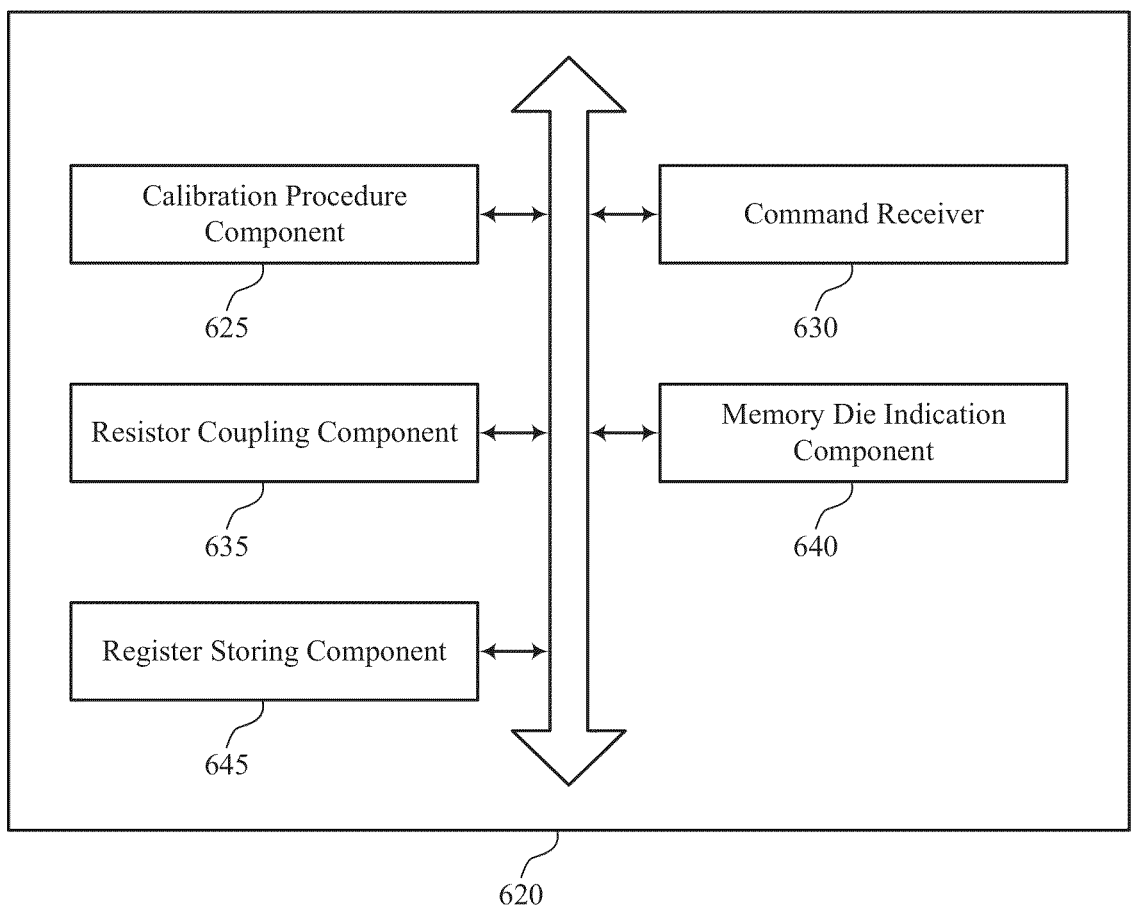
FIG. 6 illustrates a block diagram of a memory device that supports memory die fault detection using a calibration pin in accordance with examples as disclosed herein.

FIG. 6 illustrates a block diagram 600 of a memory device 620 that supports memory die fault detection using a calibration pin in accordance with examples as disclosed herein. The memory device 620 may be an example of aspects of a memory device as described with reference to FIGS. 1 through 5. The memory device 620, or various components thereof, may be an example of means for performing various aspects of memory die fault detection using a calibration pin as described herein. For example, the memory device 620 may include a calibration procedure component 625, a command receiver 630, a resistor coupling component 635, a memory die indication component 640, a register storing component 645, or any combination thereof. Each of these components may communicate, directly or indirectly, with one another (e.g., via one or more buses).

The calibration procedure component 625 may be configured as or otherwise support a means for performing a calibration procedure on a set of memory dies of a memory module serially using a pin coupled with the memory module, where performing the calibration procedure includes coupling, sequentially, the pin to respective first resistors of respective memory dies of the set of memory dies. The command receiver 630 may be configured as or otherwise support a means for receiving, from a host device, a plurality of commands after performing the calibration procedure. The resistor coupling component 635 may be configured as or otherwise support a means for coupling, by a memory die of the set of memory dies, the pin to a second resistor of the memory die based at least in part on the memory die identifying a fault condition for the memory die associated with executing one or more of the plurality of commands, where the second resistor has a lower resistance than the respective first resistor of the memory die. In some examples, the command receiver 630 may be configured as or otherwise support a means for receiving, from the host device, a command to read a register of one or more memory dies of the set of memory dies. The memory die indication component 640 may be configured as or otherwise support a means for outputting, to the host device, an indication of the memory die that identified the fault condition based at least in part on coupling the pin to the second resistor and receiving the command to read the register of the one or more memory dies.

In some examples, the memory die that identified the fault condition receives the command. In some examples, the memory die outputs the indication.

In some examples, a second memory die receives the command. In some examples, the second memory die outputs the indication. In some examples, the second memory die is distinct from the memory die that identified the fault condition.

In some examples, the second memory die includes a master memory die of the memory module.

In some examples, the register storing component 645 may be configured as or otherwise support a means for storing, at the register, the indication of the memory die that identified the fault condition based at least in part on the second memory die identifying the memory die, where outputting the indication of the memory die is based at least in part on storing the indication of the memory die at the register.

In some examples, the fault condition includes an error correcting code (ECC) engine check fault, a special function fault, a valid read operation flag fault, an ECC syndrome check fault, a master error log fault, a command/address write parity mode fault, a reset confirmation indicator fault, an unintended test mode entry flag fault, a fuse load check flag fault, or any combination thereof.

Figure 7:
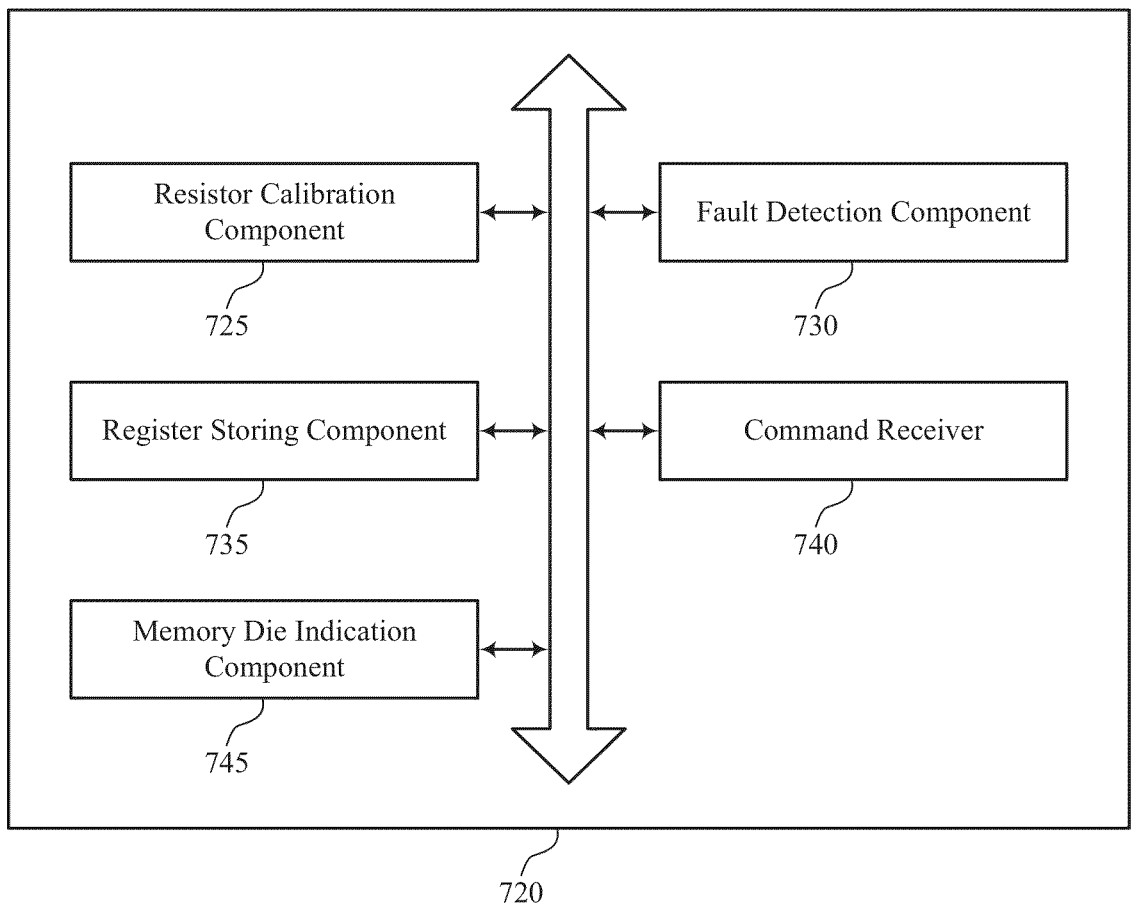
FIG. 7 illustrates a block diagram of a memory die that supports memory die fault detection using a calibration pin in accordance with examples as disclosed herein.

FIG. 7 illustrates a block diagram 700 of a memory die 720 that supports memory die fault detection using a calibration pin in accordance with examples as disclosed herein. The memory die 720 may be an example of aspects of a memory die as described with reference to FIGS. 1 through 5. The memory die 720, or various components thereof, may be an example of means for performing various aspects of memory die fault detection using a calibration pin as described herein. For example, the memory die 720 may include a resistor calibration component 725, a fault detection component 730, a register storing component 735, a command receiver 740, a memory die indication component 745, or any combination thereof. Each of these components may communicate, directly or indirectly, with one another (e.g., via one or more buses).

The resistor calibration component 725 may be configured as or otherwise support a means for calibrating a resistor of a first memory die of a set of memory dies using a pin coupled with the first memory die. The fault detection component 730 may be configured as or otherwise support a means for detecting a fault condition triggered by a second memory die of the set of memory dies based at least in part on the pin coupled with the first memory die. The register storing component 735 may be configured as or otherwise support a means for storing at a register of the first memory die, an indication of the second memory die that triggered the fault condition. The command receiver 740 may be configured as or otherwise support a means for receiving, from a host device, a command to read the register of the first memory die. The memory die indication component 745 may be configured as or otherwise support a means for outputting, to the host device, the indication of the second memory die based at least in part on receiving the command.

In some examples, detecting the fault condition includes detecting a fault signal from the pin coupled with the first memory die.

In some examples, the first memory die includes a master memory die of the set of memory dies.

In some examples, the first memory die includes a dynamic random access memory (DRAM) memory die.

In some examples, the fault condition includes an error correcting code (ECC) engine check fault, a special function fault, a valid read operation flag fault, an ECC syndrome check fault, a master error log fault, a command/address write parity mode fault, a reset confirmation indicator fault, an unintended test mode entry flag fault, a fuse load check flag fault, or any combination thereof.

Figure 8:
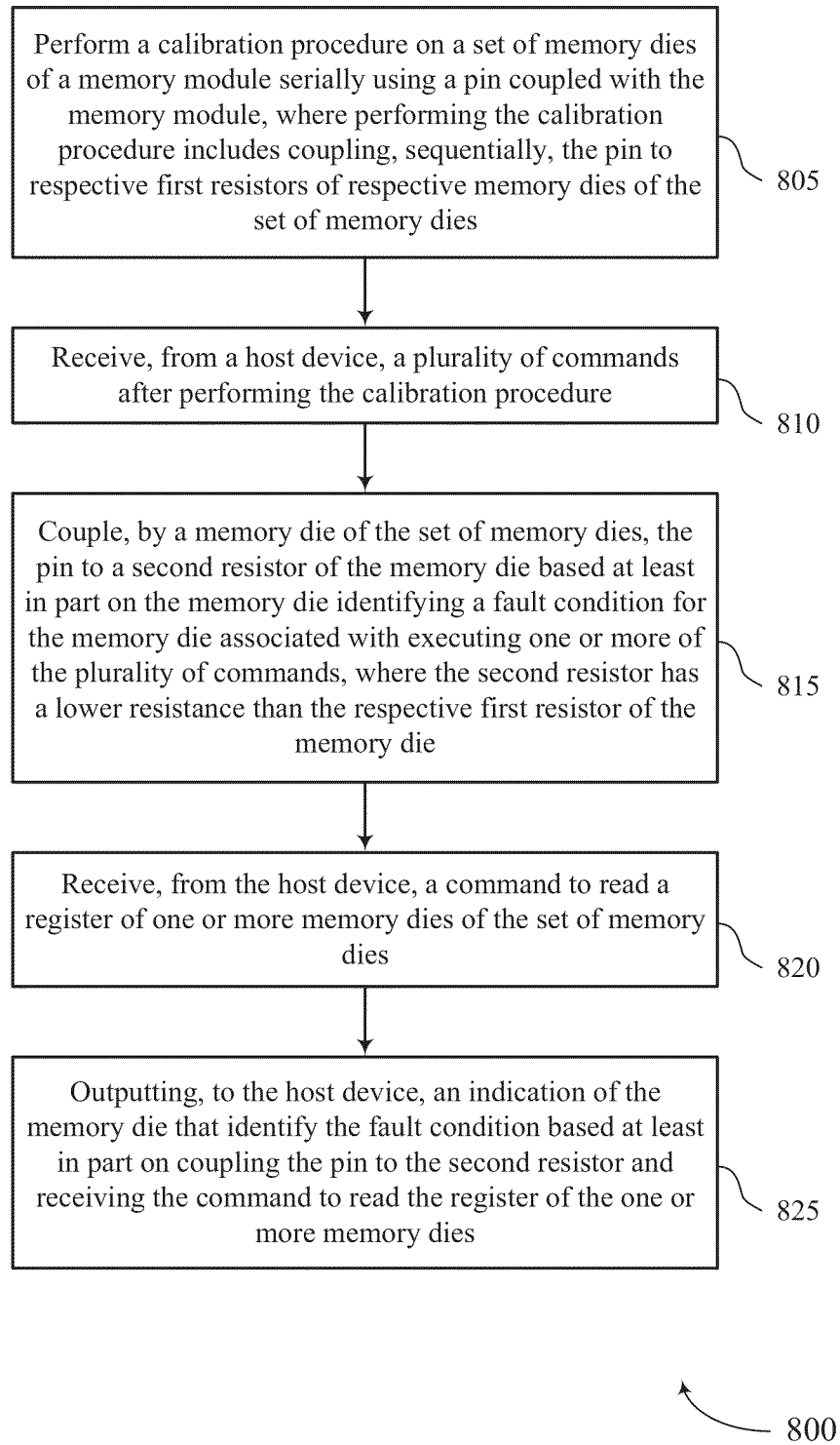
FIGS. 8 and 9 illustrate flowcharts showing a method or methods that support memory die fault detection using a calibration pin in accordance with examples as disclosed herein.

FIG. 8 illustrates a flowchart showing a method 800 that supports memory die fault detection using a calibration pin in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally, or alternatively, the memory device may perform aspects of the described functions using special-purpose hardware.

At 805, the method may include performing a calibration procedure on a set of memory dies of a memory module serially using a pin coupled with the memory module, where performing the calibration procedure includes coupling, sequentially, the pin to respective first resistors of respective memory dies of the set of memory dies. The operations of 805 may be performed in accordance with examples as disclosed herein. In some examples, aspects of the operations of 805 may be performed by a calibration procedure component 625 as described with reference to FIG. 6.

At 810, the method may include receiving, from a host device, a plurality of commands after performing the calibration procedure. The operations of 810 may be performed in accordance with examples as disclosed herein. In some examples, aspects of the operations of 810 may be performed by a command receiver 630 as described with reference to FIG. 6.

At 815, the method may include coupling, by a memory die of the set of memory dies, the pin to a second resistor of the memory die based at least in part on the memory die identifying a fault condition for the memory die associated with executing one or more of the plurality of commands, where the second resistor has a lower resistance than the respective first resistor of the memory die. The operations of 815 may be performed in accordance with examples as disclosed herein. In some examples, aspects of the operations of 815 may be performed by a resistor coupling component 635 as described with reference to FIG. 6.

At 820, the method may include receiving, from the host device, a command to read a register of one or more memory dies of the set of memory dies. The operations of 820 may be performed in accordance with examples as disclosed herein. In some examples, aspects of the operations of 820 may be performed by a command receiver 630 as described with reference to FIG. 6.

At 825, the method may include outputting, to the host device, an indication of the memory die that identified the fault condition based at least in part on coupling the pin to the second resistor and receiving the command to read the register of the one or more memory dies. The operations of 825 may be performed in accordance with examples as disclosed herein. In some examples, aspects of the operations of 825 may be performed by a memory die indication component 640 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing a calibration procedure on a set of memory dies of a memory module serially using a pin coupled with the memory module, where performing the calibration procedure includes coupling, sequentially, the pin to respective first resistors of respective memory dies of the set of memory dies; receiving, from a host device, a plurality of commands after performing the calibration procedure; coupling, by a memory die of the set of memory dies, the pin to a second resistor of the memory die based at least in part on the memory die identifying a fault condition for the memory die associated with executing one or more of the plurality of commands, where the second resistor has a lower resistance than the respective first resistor of the memory die; receiving, from the host device, a command to read a register of one or more memory dies of the set of memory dies; and outputting, to the host device, an indication of the memory die that identified the fault condition based at least in part on coupling the pin to the second resistor and receiving the command to read the register of the one or more memory dies.

Aspect 2: The method, apparatus, or non-transitory computer-readable medium of aspect 1, where the memory die that identified the fault condition receives the command and the memory die outputs the indication.

Aspect 3: The method, apparatus, or non-transitory computer-readable medium of any of aspects 1 through 2, where a second memory die receives the command; the second memory die outputs the indication; and the second memory die is distinct from the memory die that identified the fault condition.

Aspect 4: The method, apparatus, or non-transitory computer-readable medium of aspect 3, where the second memory die includes a master memory die of the memory module.

Aspect 5: The method, apparatus, or non-transitory computer-readable medium of any of aspects 3 through 4, further including operations, features, circuitry, logic, means, or instructions, or any combination thereof for storing, at the register, the indication of the memory die that identified the fault condition based at least in part on the second memory die identifying the memory die, where outputting the indication of the memory die is based at least in part on storing the indication of the memory die at the register.

Aspect 6: The method, apparatus, or non-transitory computer-readable medium of any of aspects 1 through 5, where the fault condition includes an error correcting code (ECC) engine check fault, a special function fault, a valid read operation flag fault, an ECC syndrome check fault, a master error log fault, a command/address write parity mode fault, a reset confirmation indicator fault, an unintended test mode entry flag fault, a fuse load check flag fault, or any combination thereof.

Figure 9:
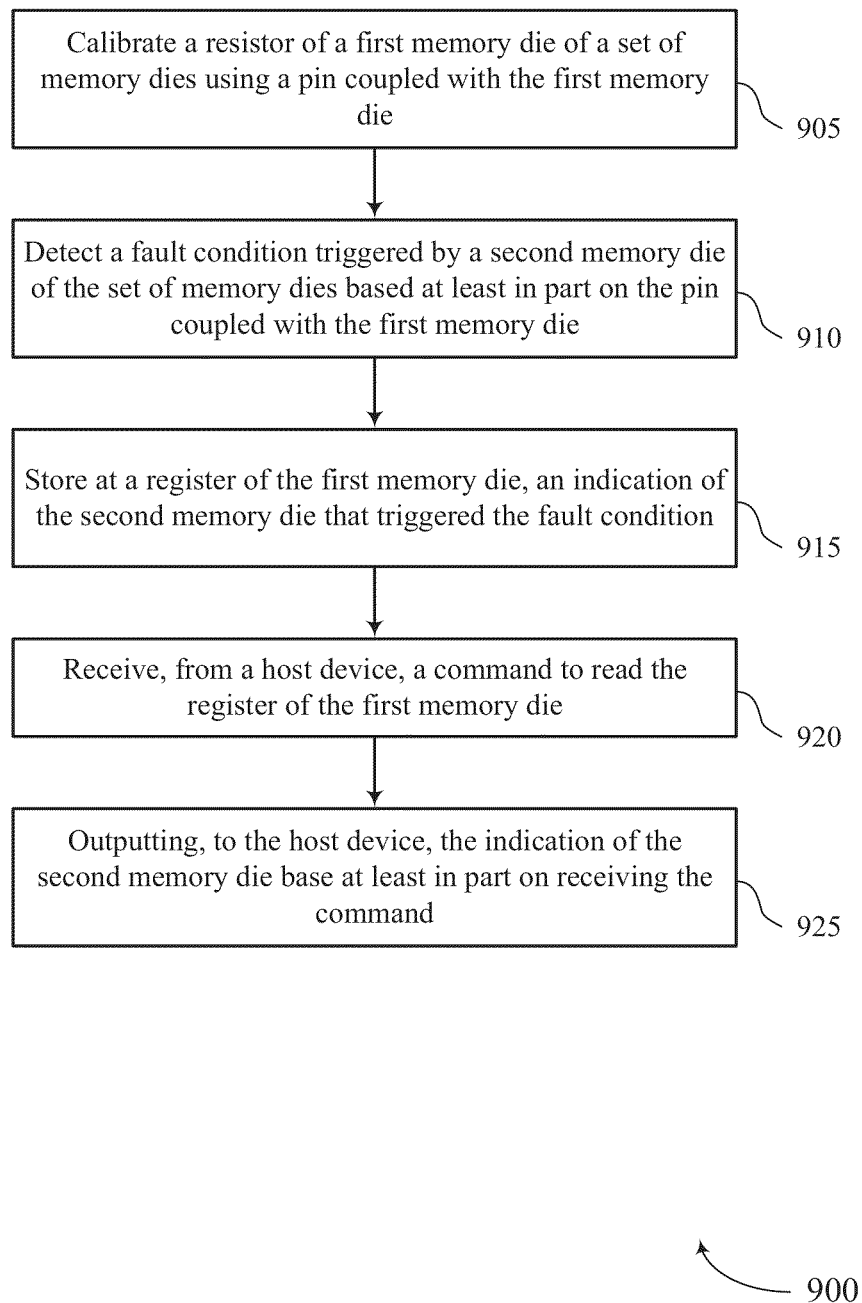

FIG. 9 illustrates a flowchart showing a method 900 that supports memory die fault detection using a calibration pin in accordance with examples as disclosed herein. The operations of method 900 may be implemented by a memory die or its components as described herein. For example, the operations of method 900 may be performed by a memory die as described with reference to FIGS. 1 through 5 and 7. In some examples, a memory die may execute a set of instructions to control the functional elements of the device to perform the described functions. Additionally, or alternatively, the memory die may perform aspects of the described functions using special-purpose hardware.

At 905, the method may include calibrating a resistor of a first memory die of a set of memory dies using a pin coupled with the first memory die. The operations of 905 may be performed in accordance with examples as disclosed herein. In some examples, aspects of the operations of 905 may be performed by a resistor calibration component 725 as described with reference to FIG. 7.

At 910, the method may include detecting a fault condition triggered by a second memory die of the set of memory dies based at least in part on the pin coupled with the first memory die. The operations of 910 may be performed in accordance with examples as disclosed herein. In some examples, aspects of the operations of 910 may be performed by a fault detection component 730 as described with reference to FIG. 7.

At 915, the method may include storing at a register of the first memory die, an indication of the second memory die that triggered the fault condition. The operations of 915 may be performed in accordance with examples as disclosed herein. In some examples, aspects of the operations of 915 may be performed by a register storing component 735 as described with reference to FIG. 7.

At 920, the method may include receiving, from a host device, a command to read the register of the first memory die. The operations of 920 may be performed in accordance with examples as disclosed herein. In some examples, aspects of the operations of 920 may be performed by a command receiver 740 as described with reference to FIG. 7.

At 925, the method may include outputting, to the host device, the indication of the second memory die based at least in part on receiving the command The operations of 925 may be performed in accordance with examples as disclosed herein. In some examples, aspects of the operations of 925 may be performed by a memory die indication component 745 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 7: A method, apparatus, or non-transitory computer-readable medium including operations, features, circuitry, logic, means, or instructions, or any combination thereof for calibrating a resistor of a first memory die of a set of memory dies using a pin coupled with the first memory die; detecting a fault condition triggered by a second memory die of the set of memory dies based at least in part on the pin coupled with the first memory die; storing at a register of the first memory die, an indication of the second memory die that triggered the fault condition; receiving, from a host device, a command to read the register of the first memory die; and outputting, to the host device, the indication of the second memory die based at least in part on receiving the command.

Aspect 8: The method, apparatus, or non-transitory computer-readable medium of aspect 7, where detecting the fault condition includes detecting a fault signal from the pin coupled with the first memory die.

Aspect 9: The method, apparatus, or non-transitory computer-readable medium of any of aspects 7 through 8, where the first memory die includes a master memory die of the set of memory dies.

Aspect 10: The method, apparatus, or non-transitory computer-readable medium of any of aspects 7 through 9, where the first memory die includes a dynamic random access memory (DRAM) memory die.

Aspect 11: The method, apparatus, or non-transitory computer-readable medium of any of aspects 7 through 10, where the fault condition includes an error correcting code (ECC) engine check fault, a special function fault, a valid read operation flag fault, an ECC syndrome check fault, a master error log fault, a command/address write parity mode fault, a reset confirmation indicator fault, an unintended test mode entry flag fault, a fuse load check flag fault, or any combination thereof.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 12: An apparatus, including: a memory module including: a plurality of memory dies; and a pin coupled with each memory die of the plurality of memory dies, where each memory die of the plurality of memory dies includes: a first resistor coupled with the pin for performing a calibration procedure on the each memory die; and a switch configured to selectively couple a second resistor of the each memory die with the pin based at least in part on the each memory die identifying a fault condition for the each memory die, where the second resistor has a lower resistance than the first resistor, and where at least one memory die of the plurality of memory dies is configured to receive, from a host device, a command to read a register of one or more memory dies of the plurality of memory dies, and where the at least one memory die is configured to output, to the host device, an indication of a memory die of the plurality of memory dies that identified the fault condition based at least in part on the at least one memory die receiving the command to read the register of the one or more memory dies and the pin being coupled with the second resistor of the memory die upon the memory die identifying the fault condition.

Aspect 13: The apparatus of aspect 12, further including: a second switch configured to selectively couple the first resistor of the each memory die with the pin for performing the calibration procedure on the each memory die.

Aspect 14: The apparatus of any of aspects 12 through 13, further including: a second memory module including a second set of memory dies; an OR gate coupled with the pin, where the OR gate is coupled with the second memory module via a second pin, where the OR gate is configured to output a fault signal when the switch couples the second resistor with the pin.

Aspect 15: The apparatus of any of aspects 12 through 14, further including: an operational amplifier coupled with the pin, where the operational amplifier is configured to output a fault signal based at least in part on the switch coupling second resistor with the pin.

Aspect 16: The apparatus of aspect 15, where the pin is coupled with a first terminal of the operational amplifier and a second terminal of the operational amplifier is coupled with a third resistor and a fourth resistor, the third resistor is coupled with a voltage source, and the fourth resistor is coupled with a ground.

Aspect 17: The apparatus of aspect 16, where the third resistor has a resistance twice as large as that of the fourth resistor.

Aspect 18: The apparatus of any of aspects 15 through 17, where the operational amplifier is coupled with the host device.

Aspect 19: The apparatus of any of aspects 15 through 18, where the host device includes the operational amplifier.

Aspect 20: The apparatus of any of aspects 12 through 19, further including: a third resistor coupled with the pin and a voltage source, where the memory die is configured to calibrate the first resistor a resistance of the third resistor during the calibration procedure.

Aspect 21: The apparatus of any of aspects 12 through 20, where the memory module includes a dynamic random access memory (DRAM) memory module.

An apparatus is described. The following provides an overview of aspects of the apparatus as described herein:

Aspect 22: An apparatus, including: a set of memory dies including: a first memory die including: a controller configured to cause the apparatus to: calibrate a resistor of the first memory die using a pin coupled with the first memory die; detect a fault condition triggered by a second memory die of the set of memory dies based at least in part on the pin coupled with the first memory die; store at a register of the first memory die, an indication of the second memory die that triggered the fault condition; receive, from a host device, a command to read the register of the first memory die; and output, to the host device, the indication of the second memory die based at least in part on receiving the command.

Aspect 23: The apparatus of aspect 22, where detecting the fault condition includes detecting a fault signal from the pin coupled with the first memory die.

Aspect 24: The apparatus of any of aspects 22 through 23, where the first memory die includes a master memory die of the set of memory dies.

Aspect 25: The apparatus of any of aspects 22 through 24, where the first memory die includes a dynamic random access memory (DRAM) memory die.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily doped, degenerate) semiconductor region. The source and drain may be separated by a doped (e.g., lightly doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
performing a calibration procedure on a set of memory dies of a memory module serially using a pin coupled with the memory module, wherein performing the calibration procedure comprises coupling, sequentially, the pin to respective first resistors of respective memory dies of the set of memory dies;
receiving, from a host device, a plurality of commands after performing the calibration procedure;
coupling, by a memory die of the set of memory dies, the pin to a second resistor of the memory die based at least in part on the memory die identifying a fault condition for the memory die associated with executing one or more of the plurality of commands, wherein the second resistor has a lower resistance than the respective first resistor of the memory die;
receiving, from the host device, a command to read a register of one or more memory dies of the set of memory dies; and
outputting, to the host device, an indication of the memory die that identified the fault condition based at least in part on coupling the pin to the second resistor and receiving the command to read the register of the one or more memory dies.

2. The method of claim 1, wherein:
the memory die that identified the fault condition receives the command, and
the memory die outputs the indication.

3. The method of claim 1, wherein:
a second memory die receives the command,
the second memory die outputs the indication, and
the second memory die is distinct from the memory die that identified the fault condition.

4. The method of claim 3, wherein the second memory die comprises a master memory die of the memory module.

5. The method of claim 3, further comprising:
storing, at the register, the indication of the memory die that identified the fault condition based at least in part on the second memory die identifying the memory die, wherein outputting the indication of the memory die is based at least in part on storing the indication of the memory die at the register.

6. The method of claim 1, wherein the fault condition comprises an error correcting code (ECC) engine check fault, a special function fault, a valid read operation flag fault, an ECC syndrome check fault, a master error log fault, a command/address write parity mode fault, a reset confirmation indicator fault, an unintended test mode entry flag fault, a fuse load check flag fault, or any combination thereof.

7. An apparatus, comprising:
a memory module comprising:
a plurality of memory dies; and
a pin coupled with each memory die of the plurality of memory dies,
wherein each memory die of the plurality of memory dies comprises:
a first resistor coupled with the pin for performing a calibration procedure on the each memory die; and
a switch configured to selectively couple a second resistor of the each memory die with the pin based at least in part on the each memory die identifying a fault condition for the each memory die, wherein the second resistor has a lower resistance than the first resistor, and
wherein at least one memory die of the plurality of memory dies is configured to receive, from a host device, a command to read a register of one or more memory dies of the plurality of memory dies, and wherein the at least one memory die is configured to output, to the host device, an indication of a memory die of the plurality of memory dies that identified the fault condition based at least in part on the at least one memory die receiving the command to read the register of the one or more memory dies and the pin being coupled with the second resistor of the memory die upon the memory die identifying the fault condition.

8. The apparatus of claim 7, further comprising:
a second switch configured to selectively couple the first resistor of each memory die of the plurality of memory dies with the pin for performing the calibration procedure on the each memory die.

9. The apparatus of claim 7, further comprising:
a second memory module comprising a second set of memory dies; and
an OR gate coupled with the pin, wherein the OR gate is coupled with the second memory module via a second pin, wherein the OR gate is configured to output a fault signal when the switch couples the second resistor with the pin.

10. The apparatus of claim 7, further comprising:
an operational amplifier coupled with the pin, wherein the operational amplifier is configured to output a fault signal based at least in part on the switch coupling second resistor with the pin.

11. The apparatus of claim 10, wherein:
the pin is coupled with a first terminal of the operational amplifier and a second terminal of the operational amplifier is coupled with a third resistor and a fourth resistor,
the third resistor is coupled with a voltage source, and
the fourth resistor is coupled with a ground.

12. The apparatus of claim 11, wherein the third resistor has a resistance twice as large as that of the fourth resistor.

13. The apparatus of claim 10, wherein the operational amplifier is coupled with the host device.

14. The apparatus of claim 10, wherein the host device comprises the operational amplifier.

15. The apparatus of claim 7, further comprising:
a third resistor coupled with the pin and a voltage source, wherein the memory die is configured to calibrate the first resistor a resistance of the third resistor during the calibration procedure.

16. The apparatus of claim 7, wherein the memory module comprises a dynamic random access memory (DRAM) memory module.

17. An apparatus, comprising:
a set of memory dies comprising:
a first memory die comprising:
a controller configured to cause the apparatus to:
calibrate a resistor of the first memory die using a pin coupled with the first memory die;
detect a fault condition triggered by a second memory die of the set of memory dies based at least in part on the pin coupled with the first memory die;

store at a register of the first memory die, an indication of the second memory die that triggered the fault condition;

receive, from a host device, a command to read the register of the first memory die; and output, to the host device, the indication of the second memory die based at least in part on receiving the command.

18. The apparatus of claim 17, wherein detecting the fault condition comprises detecting a fault signal from the pin coupled with the first memory die.

19. The apparatus of claim 17, wherein the first memory die comprises a master memory die of the set of memory dies.

20. The apparatus of claim 17, wherein the first memory die comprises a dynamic random access memory (DRAM) memory die.

* * * * *